United States Patent Office 2,805,230
Patented Sept. 3, 1957

2,805,230

ESTERS OF 17α-HYDROXY PROGESTERONE

Gilbert Stork, Leonia, N. J., and Howard J. Ringold and George Rosenkranz, Mexico City, Mexico, assignors to Syntex S. A., Mexico City, Mexico, a corporation of Mexico No Drawing. Application July 28, 1953,
Serial No. 370,856

Claims priority, application Mexico August 2, 1952

2 Claims. (Cl. 260—397.4)

The present invention relates to certain novel cyclopentanophenanthrene derivatives and to a novel method for the preparation and utilization thereof. More particularly, the present invention relates to certain novel 17α lower fatty acid acyloxy compounds of the pregnene series and especially those pregnene derivatives provided with a double bond in either the 4-5 or 5-6 positions, to a method for the preparation thereof and to a method whereby these compounds are utilized for the preparation of Δ⁴-pregnene-3,20-diones which are provided with a hydroxy group at position 17α of the molecule.

The Δ⁴-pregnene-3,20-diones having a hydroxy group at position 17α thereof includes very important and known substances such as Δ⁴-pregnene-17α,21-diol-3,20-dione (Reichstein's Compound S) and Δ⁴-pregnene-17α-ol-3,20-dione (17α-hydroxyprogesterone). Not only are these last compounds known substances, found for example in the adrenals, but they are also ideal starting material for the microbiological introduction of an oxygen function at position 11 of the steroidal molecule. Thus, from Reichstein's Compound S, by microbiological oxydation, there has already been produced the known cortical hormone known as Compound F, i. e. Δ⁴-pregnene-11β, 17α,21-triol-3,20-dione, which has been found to be of great value in the treatment of arthritis.

Although various methods have been known for the production of the compounds hereinbefore described, the preparation of the 17α-hydroxy-Δ⁴-3,20-diones is difficult since no methods are known for the introduction of the 17α-hydroxy group in steroidal Δ⁴-3-ketones, and in addition, the steroidal Δ⁵-3,17α-diols cannot be directly oxidized to the corresponding Δ⁴-3,ketones without at the same time altering the configuration of Ring D of the molecule, in accordance with the known methods.

In accordance with the present invention, however, the surprising discovery has been made that the 17α-hydroxy group may be added to 16,17-oxido-Δ⁵-pregnene-3β-ol-20-one or to esters thereof by reacting the same with hydrobromic acid or with a lower fatty acid acyl bromide followed by catalytic hydrogenation to give in the one case the corresponding 17α-hydroxy compound and in the other the corresponding 17α lower fatty acylate. It has further been discovered in accordance with the present invention that the 17α-hydroxy compound thus formed may be converted to the corresponding 17α-hydroxy acylate by treatment with the corresponding lower fatty acid acylating reagent in the presence of a strong acid selected from the class consisting of halogen acids and strong organic acids.

In accordance with the present invention, there has therefore, been provided certain novel 17α-lower fatty acid acyloxy compounds of the pregnene series, which may be further, in accordance with the present invention, converted to compounds such as 17α-hydroxy progesterone and Reichstein's Compound S.

The novel 17α-lower fatty acid acyloxy compounds of the pregnene series which are prepared in accordance with the present invention, may in their more specific aspects be exemplified by the following formula:

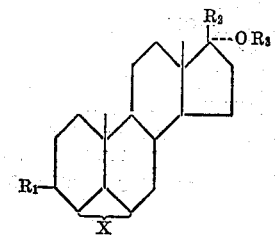

In the above formula X represents a double bond in position 4–5 or in position 5–6, $R_1$ represents a keto group or a hydroxy group or a lower fatty acid acyloxy group preferably obtained by esterification of the hydroxy group with lower fatty acids such as acetic or propionic. $R_2$ represents the group

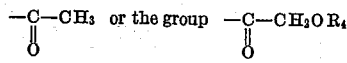

and both $R_3$ and $R_4$ represent lower fatty acid acyl groups.

A portion of the process of the present invention may be exemplified by the following equation:

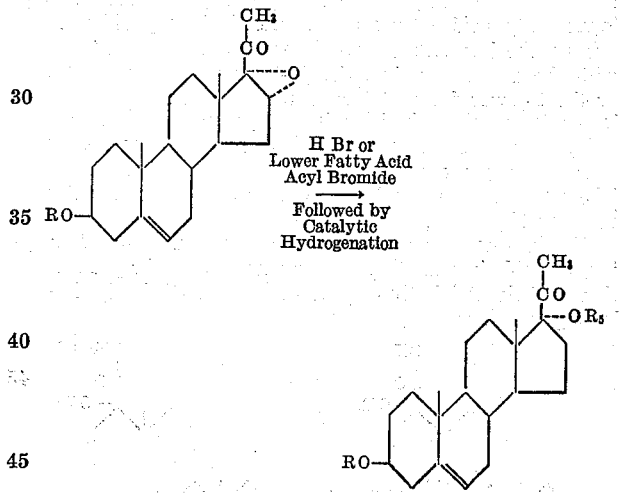

In the above formula R represents hydrogen or an acyl group preferably a lower fatty acid acyl group such as acetate or propionate or an aromatic acyl group such as benzoate. $R_5$ represents hydrogen where the reagent is H Br and a lower fatty acid acyl group where the reagent is a lower fatty acid acyl bromide.

In proceeding in accordance with the foregoing equation the known compounds such as 16,17-oxido-Δ⁵-pregnene-3β-ol-20-one or esters thereof which have been described for example by Julian et al. (J. A. C. S. 72, page 367 (1950)) may be treated either with hydrobromic acid in acetic acid or with a lower fatty acid acyl bromide such as acytyl bromide. Treatment with hydrobromic acid produced the corresponding bromohydrin, i. e. 16-bromo-Δ⁵-pregnene-3β, 17α-diol-20-one 3-acetate, which upon catalytic hydrogenation produced Δ⁵-pregnene-3β,17α-diol-20-one-3-acetate. Conventional saponification of this last compound produced the corresponding Δ⁵-pregnene-3β,11α-diol-20-one (17-hydroxypregneneolone). Similarly upon reaction with acetyl bromide followed by catalytic hydrogenation there was produced 16-bromo-Δ⁵-pregnene-3,17-diol-20-one diacetate which upon hydrogenation gave the corresponding Δ⁵-pregnene-3β,17α-diol-20-one diacetate.

The 17α-hydroxy compound prepared in accordance with the just-mentioned reaction could also be converted to the corresponding 17α lower acyloxy compound by treating the same with a lower fatty acid anhydride in the presence of a strong halogen acid or a strong organic acid in accordance with the following equation:

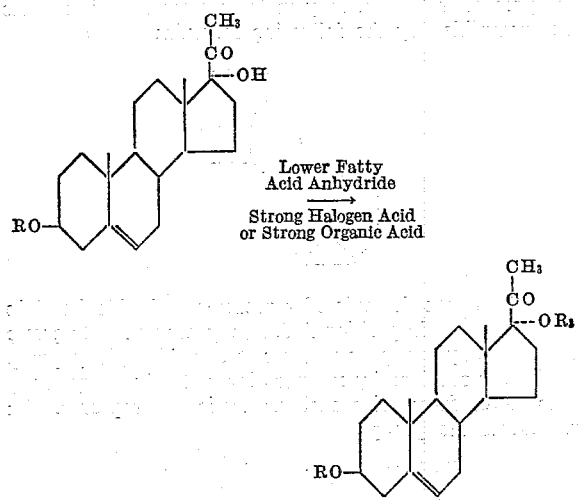

In the above equation R represents the same groups as heretofore and $R_3$ represents a lower fatty acid acyl group. In the treatment with the lower fatty acid anhydride, if R represents hydrogen obviously the corresponding lower fatty acid ester is prepared, however, this lower fatty acid ester may be selectively saponified to prepare the free compound. In proceeding in accordance with the above equation, the 17-hydroxy pregneneolone or the 3-lower fatty acid ester thereof is treated with a lower fatty acid anhydride in the presence of a strong halogen acid such as hydrobromic or hydrochloric acid or a strong organic acid such as p-toluenesulfonic acid. The resultant compound was the 3,17-diester (lower fatty acid) of $\Delta^5$-pregnene-3β,17α-diol-20-one.

The last-mentioned compound as previously set forth is a valuable intermediate, as for example for the production of Reichstein's Compound S, as set forth in the following equation:

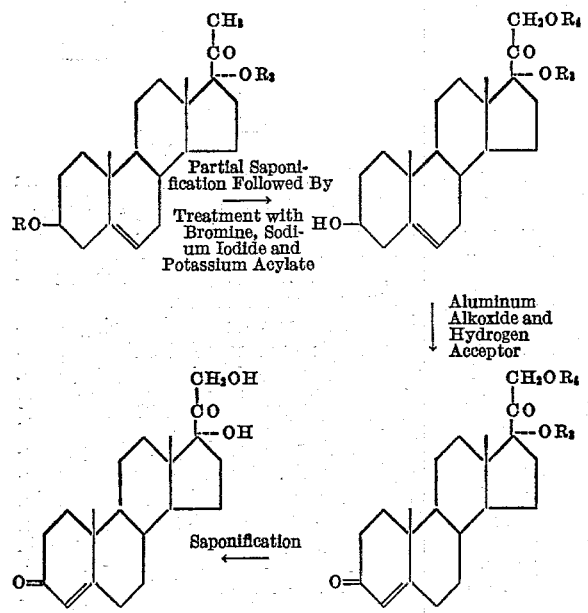

In the above equation R represents the same groups as heretofore. $R_3$ represents, as previously set forth, a lower fatty acid acyl group and $R_4$ also represents a lower fatty acid acyl group.

In practicing the method above set forth a compound such as $\Delta^5$-pregnene-3β,17α-diol-20-one diacetate is partially saponified as by treatment with a mild saponifying agent such as potassium bicarbonate under reflux conditions or by treatment with a stronger saponifying agent such as potassium hydroxide at a low temperature such as 5° C. to convert the 3-acyloxy group to the corresponding 3-hydroxy group. The resultant compound, namely $\Delta^5$-pregnene-3β-17α-diol-20-one 17-monoacetate is then dissolved in a suitable solvent and treated with sodium iodide to form the corresponding 21-iodo compound. This 21-iodo compound is then treated with potassium acetate or potassium propionate and refluxed to produce the corresponding $\Delta^5$-pregnene-3β,17α,21-triol-20-one 17,21-diacetate. This last compound can then be treated with an aluminum alkoxide such as aluminum isopropylate in the presence of a suitable hydrogen acceptor, preferably a ketone hydrogen acceptor such as cyclohexanone to produce the corresponding 3-keto $\Delta^4$ compound as illustrated in the above equation. Upon total saponification of this last compound there has been produced Reichstein's Compound S.

If the partial saponification just previously described is followed by treatment with an aluminum alkoxide in the presence of a hydrogen acceptor without the reaction to add the 21-hydroxy or acyloxy group, there is then produced upon saponification the known compound 17α-hydroxyprogesterone. This reaction is illustrated by the following equation:

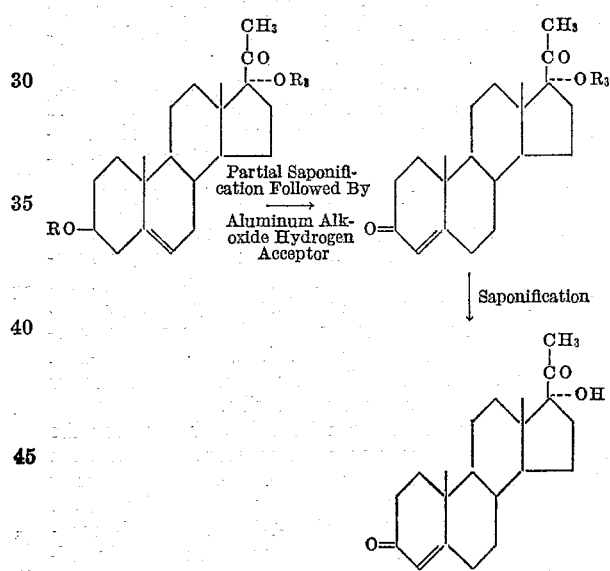

In the above equation R and $R_3$ represent the same groups as heretofore.

There may be further produced in accordance with the present invention certain novel 21-acyloxy-17α-hydroxypregneneolone compounds as illustrated in the following equation:

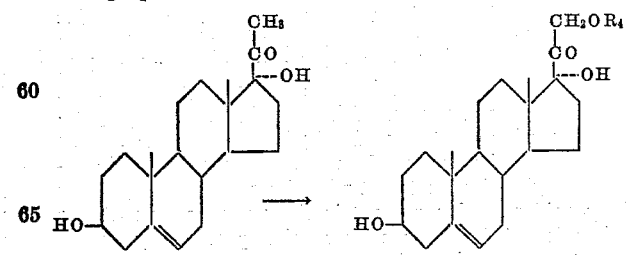

In the above equation, $R_4$ represents the same groups as heretofore, and as may be readily understood, the starting compound 17α-hydroxypregneneolone is treated first with bromine to produce the 21-bromo derivative thereafter with sodium iodide and finally with potassium acetate or an equivalent potassium lower fatty acid acylate to prepare the corresponding $\Delta^5$-pregnene-3β,17α,21-triol-20-one 21-lower fatty acid acylate.

The following specific examples serve to illustrate but are not intended to limit the present invention:

Example I 27 g. of 16,17-oxido-$\Delta^5$-pregnene-3$\beta$-ol-20-one were dissolved in 160 cc. of pyridine and 320 cc. of acetic anhydride and the solution was heated on a steam bath for 90 minutes and then poured into water. The precipitate was filtered, washed with dilute hydrochloric acid, water, sodium bicarbonate solution and water until neutral, giving 29 g. of 16,17-oxido-$\Delta^5$-pregnene-3$\beta$-ol-20-one acetate which after recrystallization from acetone had a melting point of 158°–160° C.

Example II 25 g. of 16,17-oxido-$\Delta^5$-pregnene-3$\beta$-ol-20-one acetate were dissolved in 250 cc. of hot acetic acid and cooled to 18° C. 50 cc. were added of a 32% solution of hydrogen bromide in acetic acid, the flask was stoppered and the mixture was kept for 20 minutes at 18° C. It was then poured into water, with mechanical stirring, and the precipitate was filtered, washed with water until neutral and dried under vacuum at room temperature. The bromohydrin 16-bromo-$\Delta^5$-pregnene-3$\beta$,17$\alpha$-diol-20-one 3-acetate thus obtained, which was still slightly moist, was suspended in 2 lt. of ethanol distilled over Raney nickel. 100 g. of a 2% palladium on calcium carbonate catalyst were added and the mixture was hydrogenated for 20 hours under 50 pounds pressure. The solution was then heated nearly to boiling and filtered while hot. The catalyst was filtered with hot alcohol and the combined filtrate was concentrated, giving 24.4 g. of $\Delta^5$-pregnene-3$\beta$,17$\alpha$-diol-20-one 3-acetate, which after recrystallization from benzene had a melting point of 223°–227° C.

Example III

A solution of 20 g. of the $\Delta^5$-pregnene-3$\beta$,17$\alpha$-diol-20-one 3-acetate, obtained in accordance with Example II, in 870 cc. of hot methanol was mixed with a solution of 20 g. of potassium carbonate in 70 cc. of hot water. The mixture was refluxed for 1 hour, cooled, and concentrated at low temperature under vacuum until crystallization of the product. 16 g. were obtained of $\Delta^5$-pregnene-3$\beta$,11$\alpha$-diol-20-one (17-hydroxypregneneolone) with a melting point of 263°–267° C.

Example IV

A solution of 25 g. of 16,17-oxido-$\Delta^5$-pregnene-3$\beta$-ol-20-one in 250 cc. of C. P. glacial acetic acid was cooled to 18° C. and treated with 50 cc. of a 32% solution of hydrogen bromide in acetic acid; the flask was stoppered and the mixture was kept for 15 minutes at 18° C. and then poured into water with mechanical stirring. The precipitate was filtered and washed to neutral with water. The wet bromohydrin 16-bromo-$\Delta^5$-pregnene-3$\beta$,17$\alpha$-diol-20-one thus obtained was suspended in 1 lt. of ethanol distilled over Raney nickel and the mixture was hydrogenated in the presence of 90 g. of 2% palladium on calcium carbonate catalyst, such as described in Example II. 21.5 g .were obtained of slightly impure 17-hydroxypregneneolone with a melting point above 250° C.

Example V 1 g. of 16,17-epoxido-$\Delta^5$-pregnene-3$\beta$,ol-20-one or the acetate thereof was dissolved at room temperature in 10 cc. of acetyl bromide and the mixture was kept for four hours at room temperature. The clear solution was poured into ice and the precipitate of crude 16-bromo-$\Delta^5$-pregnene-3$\beta$,17$\alpha$-diol-20-one diacetate was filtered, washed with water and dried in air. This product was dissolved in 30 cc. of ethanol previously distilled over Raney nickel and the mixture was hydrogenated overnight in the presence of 3 g. of 2% palladium on calcium carbonate catalyst, at room temperature and atmospheric pressure. The catalyst was filtered and the alcoholic solution was concentrated under vacuum to a final volume of 5 cc. After keeping the mixture overnight in the refrigerator, the crystalline precipitate was collected, giving 700 mg. of $\Delta^5$-pregnene-3$\beta$,17$\alpha$-diol-20-one diacetate with a melting point of 178°–180° C., $[\alpha]_D$ —60° (chloroform).

Example VI

A solution of 1 g. of 17-hydroxypregneneolone, obtained in accordance with the method described in Example II, in 50 cc. of acetic anhydride was refluxed for a short time to form the 3-monoacetate. 0.57 g. of p-toluenesulfonic monohydrate acid were added to the cooled solution and the mixture was stirred for several hours until complete solution. The mixture was kept at room temperature during 64 hours and then the clear solution was poured into water and the aqueous suspension was heated in order to hydrolize the excess of acetic anhydride. 1.2 g. were obtained of $\Delta^5$-pregnene-3$\beta$,17$\alpha$-diol-20-one diacetate which after recrystallization from methanol had a melting point of 178°–181° C.

The same reaction can be carried out with essentially the same result, starting with the 3-monoacetate of 17-hydroxypregneneolone.

Example VII

A solution of 0.5 g. of 17-hydroxypregneneolone in 25 cc. of acetic anhydride was treated with 1.5 cc. of a 32% solution of hydrogen bromide in acetic acid and the mixture was kept for 60 hours at room temperature and then poured into water. The precipitate was filtered and washed with water, thus giving 0.57 g. of the 3,17-diacetate which after crystallization from methanol had a melting point of 178°–181° C., identical to the one obtained in accordance with Example VI.

If in this example the 1.5 cc. of hydrogen bromide solution is substituted by 1.5 cc. of concentrated hydrochloric acid, the same result is obtained with the same yield.

Example VIII

A solution of 3 g. of $\Delta^5$-pregnene-3$\beta$,17$\alpha$-diol-20-one diacetate (diacetate of 17-hydroxypregneneolone) in 366 cc. of ethanol was mixed with a solution of 20 g. of potassium bicarbonate in 144 cc. of water and the mixture was refluxed for one hour. The cooled solution was poured into water and the precipitate was filtered, washed to neutral and recrystallized from ethyl acetate-hexane, thus giving 2.4 g. of $\Delta^5$-pregnene-3$\beta$,17$\alpha$-diol-20-one 17-monoacetate with a melting point of 218°–220° C., $[\alpha]_D$ —62° (chloroform). The analytical sample of this compound had a melting point of 222°–226° C. $[\alpha]_D$ —63° (chloroform).

Example IX

A solution of 0.5 g. of $\Delta^5$-pregnene-3$\beta$,17$\alpha$-diol-20-one diacetate in 40 cc. of methanol was cooled to 5° C. and mixed with a solution of 0.5 g. of potassium hydroxide in 10 cc. of methanol, previously cooled to 5° C. Without further cooling, the mixture was kept for 1 hour, when it had reached room temperature, and then the clear solution was poured into water. The precipitate was filtered, washed with water and dried. 0.42 g. were obtained of the 17-monoacetate of $\Delta^5$-pregnene-3$\beta$,17$\alpha$-diol-20-one with a melting point of 222°–225° C., $[\alpha]_D$ —61° (chloroform).

Example X 1. g. of $\Delta^5$-pregnene-3$\beta$,17$\alpha$-diol-20-one 17-monoacetate was dissolved in a mixture of 38 cc. of toluene and 9 cc. of cyclohexanone, and 5 cc. of the mixture were distilled in order to remove traces of moisture. A solution was added of 0.45 g. of aluminum isopropylate in 5 cc. of toluene and the mixture was refluxed during 45 minutes. Water was added to the cooled solution and the organic solvents were removed by steam distillation. The aqueous suspension was extracted with chloroform and crystallization of the product from chloroform-methanol afforded 630 mg. of Δ⁴-pregnene-17α-ol-3,20-dione-17-acetate (17-acetoxyprogesterone), with a melting point of 239°–240° C., which showed an ultraviolet absorption maximum at λ max. 240 mμ, log E 4.33.

0.5 g. of this 17-acetoxyprogesterone were refluxed during 1 hour with 100 cc. of a 2% solution of potassium hydroxide in methanol. After adding 2 cc. of acetic acid to the cooled solution, it was concentrated under vacuum to a small volume and diluted with water. The product was extracted with chloroform and crystallization from the same solvent yielded 0.4 g. of Δ⁴-pregnene-17α-ol-3,20-dione (17-hydroxyprogesterone) with a melting point of 217°–219° C., [α]$_D$ +102° (chloroform).

Example XI

A solution of 1.4 g. of bromine in 25 cc. of chloroform was added in the course of 30 minutes to a stirred solution of 1.5 g. of Δ⁵-pregnene-3β,17α-diol-20-one 17-monoacetate in 50 cc. of chloroform. The chloroform solution was washed with aqueous sodium bicarbonate solution and with water, dried over sodium sulfate and evaporated to dryness under vacuum. The residue was dissolved in 40 cc. of anhydrous benzene and mixed with a solution of 4.5 g. of sodium iodide in 30 cc. absolute ethanol. The mixture was kept under anhydrous conditions during 24 hours at room temperature, and then it was diluted with ether, washed with aqueous sodium thiosulfate solution and water, dried over sodium sulfate and concentrated to dryness under vacuum. The residue (i. e. the crude 21-iodo derivative) was dissolved in 25 cc. of anhydrous acetone and treated with a suspension of potassium acetate in acetone prepared from 7.8 g. of potassium bicarbonate, 4.8 cc. of acetic acid and 30.9 cc. of acetone. The mixture was refluxed for 12 hours, concentrated to a small volume and poured into water. The precipitate was filtered and washed, thus giving, after one crystallization from acetone-hexane, 1 g. of Δ⁵-pregnene-3β,17α,21-triol-20-one 17,21-diacetate.

When the above experiment was repeated, it was found that the crude bromo derivative can be directly refluxed with 4.5 g. of sodium iodide in 50 cc. of acetone and then treated with the suspension of potassium acetate without isolation of the intermediate iodo-compound.

Example XII 0.7 g. of Δ⁵-pregnene-3β,17α,21-triol-20-one 17,21-diacetate were dissolved in 27 cc. of toluene and 6.5 cc. of cyclohexanone and 3 cc. of the mixture were distilled in order to remove traces of moisture. A solution was added of 0.315 g. of aluminum isopropylate in 4 cc. of toluene and the mixture was refluxed during 45 minutes. Water was added and the organic solvents were removed by steam distillation. The precipitate formed in the aqueous phase during the steam distillation was filtered and crystallized from chloroform-methanol, thus yielding Δ⁴-pregnene-17α,21-diol-3,20-dione diacetate (17,21-diacetoxyprogesterone or Reichstein's Compound S diacetate).

Example XIII

A solution of 0.5 g. of the diacetate obtained in accordance with Example XII in 50 cc. of methanol was mixed at room temperature with a solution of 1 g. of potassium hydroxide in 20 cc. of methanol. The flask was flushed with nitrogen, stoppered and kept in the refrigerator for 64 hours. The solution was acidified with acetic acid, concentrated under vacuum and poured into water. The precipitate was filtered, washed with water and recrystallized from acetone, thus yielding 0.3 g. of Δ⁴-pregnene-17α,21-diol-3,20-dione (Reichstein's Compound S) with a melting point of 209°–212° C.

A solution of 2 g. of the above diacetate in 300 cc. of methanol was mixed with a solution of 2 g. of potassium bicarbonate in 40 cc. of water and the mixture was kept for 23 hours at room temperature. It was then poured into water and the product was extracted with chloroform, washed with water, dried over sodium sulfate and evaporated to dryness. Recrystallization of the residue from acetone afforded 1.2 g. of Reichstein's Compound S with a melting point of 209°–212° C.

A solution of 1.3 g. of the above diacetate in 300 cc. of methanol was mixed with a solution of 4 g. of potassium bicarbonate in 40 cc. of water and the mixture was refluxed during 2 hours under an atmosphere of nitrogen. It was poured into water, acidified with acetic acid and the product was extracted with ethyl acetate or chloroform, washed with water, dried over sodium sulfate and evaporated to dryness. Crystallization of the residue from acetone afforded 0.8 g. of Reichstein's Compound S with a melting point of 209°–212° C.

Example XIV

A solution of 1 g. of 17-hydroxypregneneolone in 100 cc. of hot anhydrous dioxane and then cooled to room temperature was treated dropwise with a solution of 1.05 g. of bromine in 10 cc. of anhydrous dioxane and the solution was stirred until disappearance of the yellow color. The mixture was poured into water and the precipitate was filtered and washed with water to neutral.

The crude bromo compound was suspended in 12 cc. of anhydrous benzene and treated with a solution of 3 g. of sodium iodide in 14 cc. of absolute ethanol. The solution was kept at room temperature for 24 hours and then poured into water, extracted with ether, washed with 10% sodium thiosulfate solution and dried over sodium sulfate. The filtered solution was concentrated to dryness.

The iodo derivative thus obtained was dissolved in 60 cc. of anhydrous acetone, mixed with 7.5 g. of potassium acetate nad refluxed for 12 hours. The solution was concentrated to a small volume and then poured into water. 0.9 g. were obtained of Δ⁵-pregnene-3β,17α,21-triol-20-one 21-acetate which after crystallization from acetone had a melting point of 185°–192° C. The analytical sample was obtained after repeated crystallizations from acetone, with a melting point of 212–215° C. [α]$_D$ +9.5°.

We claim:
1. Lower fatty acid esters of Δ⁴-pregnene-17α-ol-3,20-dione.
2. Δ⁴-pregnene-17α-ol-3,20-dione acetate.

References Cited in the file of this patent

UNITED STATES PATENTS

| | | |
|---|---|---|
| 2,239,012 | Miescher | Apr. 22, 1941 |
| 2,365,292 | Ruzicka | Dec. 19, 1944 |
| 2,602,804 | Kendall | July 8, 1952 |
| 2,753,360 | Kaspar | July 3, 1956 |

FOREIGN PATENTS

| | | |
|---|---|---|
| 236,013 | Switzerland | May 16, 1945 |

OTHER REFERENCES

Minton: JACS 74, 5394–5396, November 1952.
Turner: JACS 75, 3489–3492 (July 20, 1953).